(12) United States Patent
Oberland

(10) Patent No.: US 7,885,550 B2
(45) Date of Patent: Feb. 8, 2011

(54) METHOD AND APPARATUS FOR PRODUCING RZ-DPSK MODULATED OPTICAL SIGNALS

(75) Inventor: Richard Oberland, London (GB)

(73) Assignee: Xtera Communications Ltd., Harold Wood, Romford, Essex (GB)

( * ) Notice: Subject to any disclaimer, the term of this patent is extended or adjusted under 35 U.S.C. 154(b) by 612 days.

(21) Appl. No.: 10/595,981

(22) PCT Filed: Jul. 15, 2004

(86) PCT No.: PCT/GB2004/003092

§ 371 (c)(1),
(2), (4) Date: Sep. 13, 2006

(87) PCT Pub. No.: WO2005/055475

PCT Pub. Date: Jun. 16, 2005

(65) Prior Publication Data

US 2007/0116477 A1    May 24, 2007

(30) Foreign Application Priority Data

Nov. 27, 2003    (GB) ................................. 0327605.2

(51) Int. Cl.
*H04B 10/04* (2006.01)
(52) U.S. Cl. ........................ 398/190; 398/183; 398/201
(58) Field of Classification Search .......... 398/182–202
See application file for complete search history.

(56) References Cited

U.S. PATENT DOCUMENTS 5,625,722 A * 4/1997 Froberg et al. .................. 385/1

(Continued)

FOREIGN PATENT DOCUMENTS

EP    0977382 A2    2/2000

(Continued)

OTHER PUBLICATIONS

Griffin R., et al., Optical Society of America/Institute of Electrical and Elecdtronics Engineers: Integrated DQPSK Transmitter for Dispersion-Tolerant and Dispersion-Managed DWDM Transmission; Mar. 23, 2003, vol. TOPS. vol. 86.

(Continued)

*Primary Examiner*—Dzung D Tran
(74) *Attorney, Agent, or Firm*—Workman Nydegger

(57) ABSTRACT

The invention provides an optical transmitter comprising a differential encoder having first and second outputs, the first and second outputs being of opposite polarity to one another, a first RZ converter connected to the first output of the differential encoder and a second RZ converter connected to the second output of the differential encoder, and a dual electrode Mach Zehnder modulator to which an unmodulated coherent light source is coupled, wherein the output of the first RZ converter is connected to a first electrode of the Mach Zehnder modulator and the output of the second RZ converter is connected to a second electrode of the Mach Zehnder modulator. The invention provides improved signal integrity as compared with existing RZ-DPSK solution through the use of high quality RZ drivers. Furthermore, the invention gives rise to controllable RZ pulse edge chirping, providing rapid pulse compression or broadening through a dispersive fibre length. This can be used to mitigate pulse distortion in nonlinear transmission links.

7 Claims, 2 Drawing Sheets

U.S. PATENT DOCUMENTS

| | | | |
|---|---|---|---|
| 6,535,316 B1 * | 3/2003 | Mizuhara | 398/183 |
| 6,559,996 B1 * | 5/2003 | Miyamoto et al. | 398/183 |
| 6,621,617 B1 | 9/2003 | Poggiolini | |
| 7,068,948 B2 * | 6/2006 | Wei et al. | 398/184 |
| 2006/0245763 A1 * | 11/2006 | Ishida et al. | 398/186 |

FOREIGN PATENT DOCUMENTS

| | | |
|---|---|---|
| EP | 1 271 808 | 1/2003 |
| GB | 2383424 A | 6/2003 |
| JP | 2000106543 A | 4/2000 |
| WO | 2005025094 A1 | 3/2005 |

OTHER PUBLICATIONS

Application No. GB03276052, Search Report dated May 25, 2004 (1 page).

International Application No. PCT/GB2004/003092; Written Opinion of the International Searching Authority dated May 29, 2006 (11 pages).

Japanese Patent Application No. 2006-540566, Office Action dated Dec. 18, 2007 (6 pages).

Japanese Patent Application No. 2006-540566, Office Action dated Feb. 19, 2009 (5 pages).

* cited by examiner

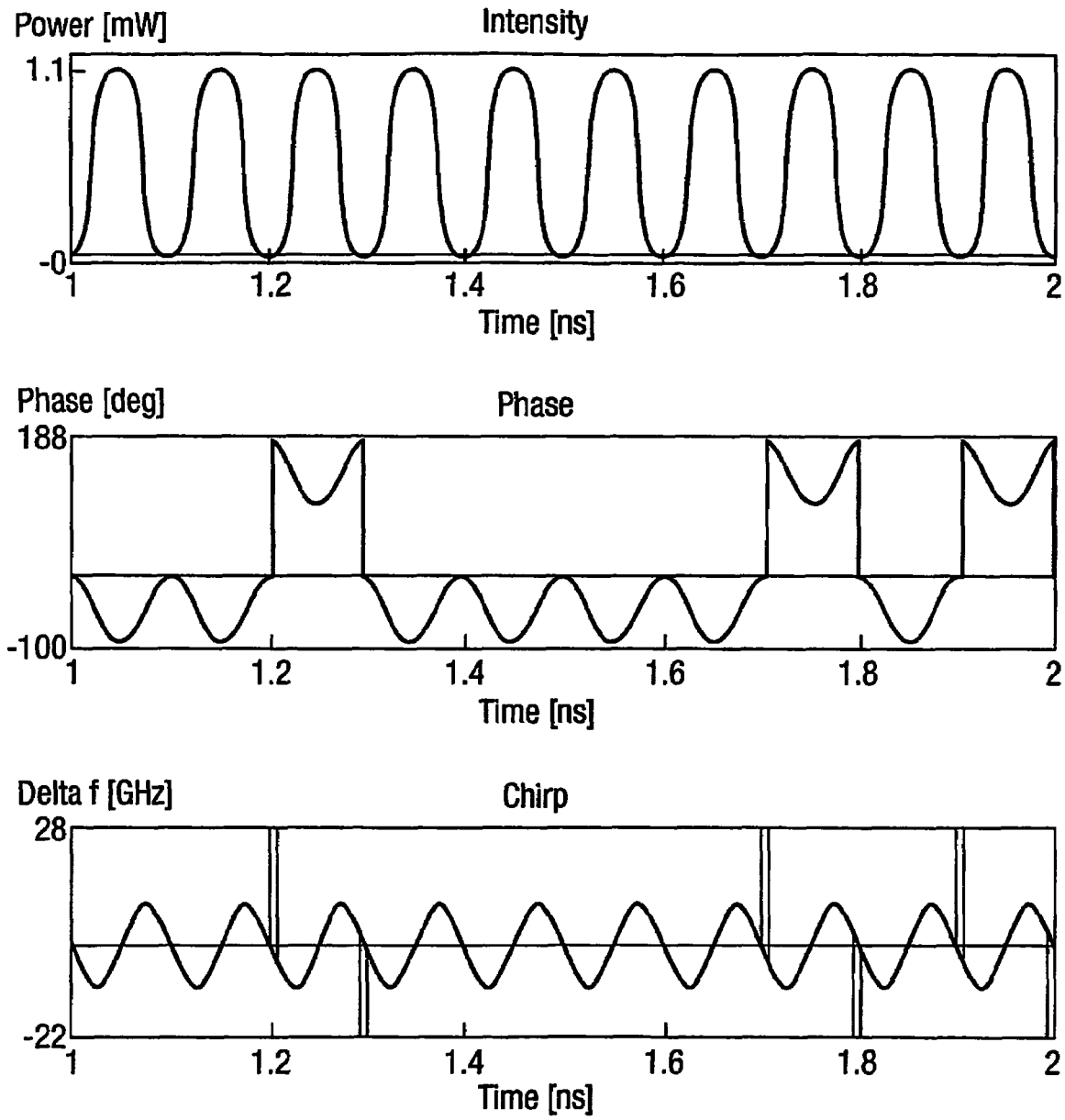

METHOD AND APPARATUS FOR PRODUCING RZ-DPSK MODULATED OPTICAL SIGNALS

FIELD OF THE INVENTION

The present invention relates to a method and transmitter for generating a return to zero differential phase shift keyed (RZ-DPSK) modulated optical signal.

BACKGROUND TO THE INVENTION

RZ-DPSK is commonly used in long haul transmission. Typically, a transmitter for generating an RZ-DPSK signal consists of a phase shift keyed (PSK) modulation part and an RZ pulse carving part. In fact, all methods to date require at least two separate modulators in this way, one to phase modulate the signal and one to carve the RZ pulses. This is shown in FIG. 1.

In all methods, the source data must first be differentially encoded, prior to optical modulation. This is typically achieved using a high speed exclusive OR gate with the output tapped and fed back by a one bit delay to the input. This encoding is required because the receiver side demodulator relies on a one bit optical delay for phase comparisons.

To convert the differentially encoded electrical signal to a modulated optical signal, laser light is phase modulated using a phase modulator or a chirp free Mach Zehnder intensity modulator. The phase modulator approach obeys analogue behaviour with respect to the drive voltage. Hence, any discrepancy in the electrical signal passes on directly to the optical signal as fluctuations in the phase of the light. The Mach Zehnder approach removes these phase fluctuations by chirp free operation and relies on the fact that the light changes phase by 180° when driving through the minimum throughput bias point In this way, exact 180° phase encoding can be achieved at the expense of additional intensity modulation. The inherent intensity modulation is removed by gating with an RZ pulse carver stage to form RZ-DPSK signals.

Each optical bit is intensity modulated to produce a repetitive stream of RZ pulses. The RZ intensity modulation is usually provided by a sine wave driven Mach Zehnder modulator. A Mach Zehnder modulator can be driven in several ways, typically with either a full rate clock driver at the quadrature bias point to give 50% duty cycle pulses or with a half rate clock driver at the maxima or minima bias points to give 33% or 66% duty cycles respectively. FIG. 1 shows a standard 33% or 66% RZ-DPSK transmitter configuration in accordance with the prior art.

As mentioned above, in the systems of the prior art, phase and intensity fluctuations result from the driver output signal quality, and also the driver to modulator interface. Standard NRZ drivers can be particularly noisy due to inter symbol interference (ISI) generated from the broadband driver response.

SUMMARY OF THE INVENTION

According to a first aspect of the present invention, an optical transmitter comprises:

a differential encoder having first and second outputs, the first and second outputs being of opposite polarity to one another, a first RZ converter connected to the first output of the differential encoder and a second RZ converter connected to the second output of the differential encoder; and a dual electrode Mach Zehnder modulator to which an unmodulated coherent light source is coupled, wherein the output of the first RZ converter is connected to a first electrode of the Mach Zehnder modulator and the output of the second RZ converter is connected to a second electrode of the Mach Zehnder modulator.

Preferably, the transmitter further includes inverting RZ drivers to convert RZ signals output from the RZ converters to inverted RZ signals. Inverted RZ drivers typically have a better output quality than non-inverted RZ drivers.

Preferably, one of the RZ converter outputs can be delayed by adjusting the phase of a clock signal input to the RZ converter, to synchronise the two RZ signals.

According to a second aspect of the present invention, a method of encoding data as a differential phase shift keyed RZ optical signal comprises the steps of:

differentially encoding the data to produce two data streams of opposite polarity;

converting each data stream to RZ signal format; and driving a first electrode of a dual electrode Mach Zehnder modulator to which an unmodulated coherent light source is coupled with a first one of the RZ data streams and driving a second electrode of the dual electrode Mach Zehnder modulator with a second one of the RZ data streams.

Preferably, the RZ data streams are inverted RZ data streams.

The present invention provides improved signal integrity as compared with existing RZ-DPSK solutions through the use of high quality RZ drivers. Furthermore, the present invention gives rise to controllable RZ pulse edge chirping, providing rapid pulse compression or broadening through a dispersive fibre length. This typically mitigates pulse distortion in non-linear transmission links.

The present invention requires the use of only a single Mach Zehnder modulator. All prior RZ-DPSK transmitters require two modulators in series. The present invention accordingly provides benefits in terms of cost, size and power consumption.

With the method and system of the present invention, the RZ duty cycle or pulse width can be controlled by the electrical drive signal. By contrast, prior transmitter schemes having only a fixed or limited pulse width control.

BRIEF DESCRIPTION OF THE DRAWINGS

An example of the present invention will now be described with reference to the accompanying drawings, in which:

FIG. 3 shows plots of the output intensity, phase and chirp for a transmitter in accordance with the present invention.

DETAILED DESCRIPTION

Figure 1:
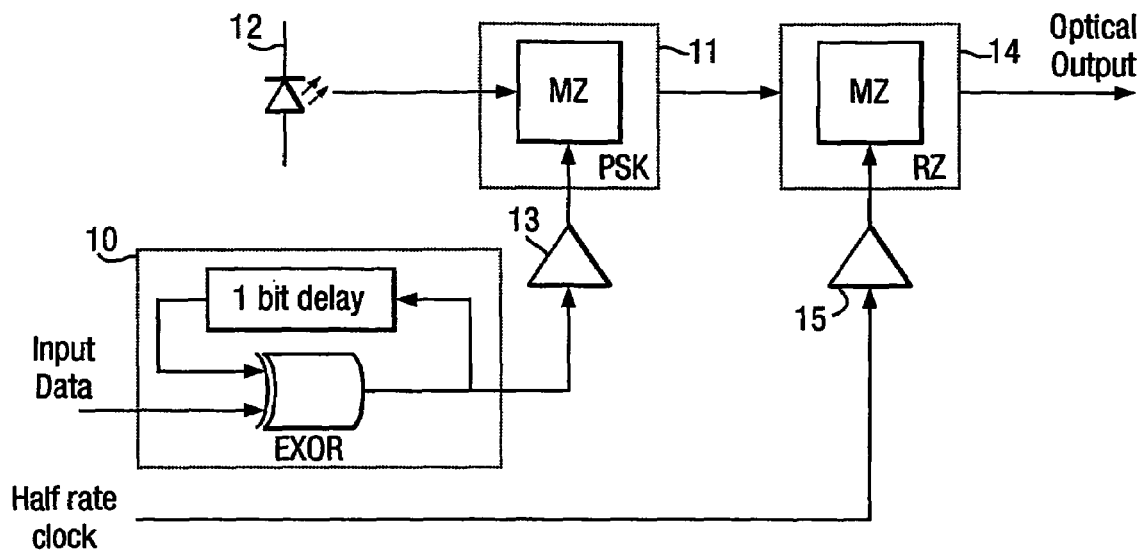
FIG. 1 shows an RZ-DPSK encoded transmitter in accordance with the prior art.

FIG. 1 shows an RZ-DPSK encoded transmitter in accordance with the prior art. Electrical input data is differentially encoded by differential encoder 10. The differential encoder comprises an exclusive OR gate with the output delayed by one bit and fed back to the input. The differentially encoded data is used to phase modulate a coherent light signal from a coherent light source 12. The modulator shown in FIG. 1 is a Mach Zehnder (MZ) modulator 11, which is chirp-free. The MZ modulator is driven by an NRZ modulator driver 13. The output from the MZ modulator 11 is a phase encoded optical signal. This is converted to an RZ signal by the use of a second MZ modulator 14. The second MZ modulator is used as an RZ pulse carver and is driven by a narrow band modulator driver 15. The driver 15 as shown is driven by a half rate clock at the minima bias point to give a 66% duty cycle.

The limitations of this type of transmitter are that phase and intensity fluctuations in the optical signal result from the driver output signal quality and from the driver/modulator interface. Standard NRZ drivers can be particularly noisy due to ISI generated from the broad band driver response. Furthermore, the transmitter requires two separate modulators.

Electrical RZ transmitters are now available and they are replacing old style optical RZ gated transmitters in current systems. These typically show better performance than NRZ transmitters owing to the extinction ratio achieved. The RZ drive signal is better than its NRZ counterpart in two ways:

1. The input data is re-timed and re-shaped at the RZ conversion stage, and
2. RZ drivers are internally biased to compress one of the logic levels, reducing the noise.

Figure 2:
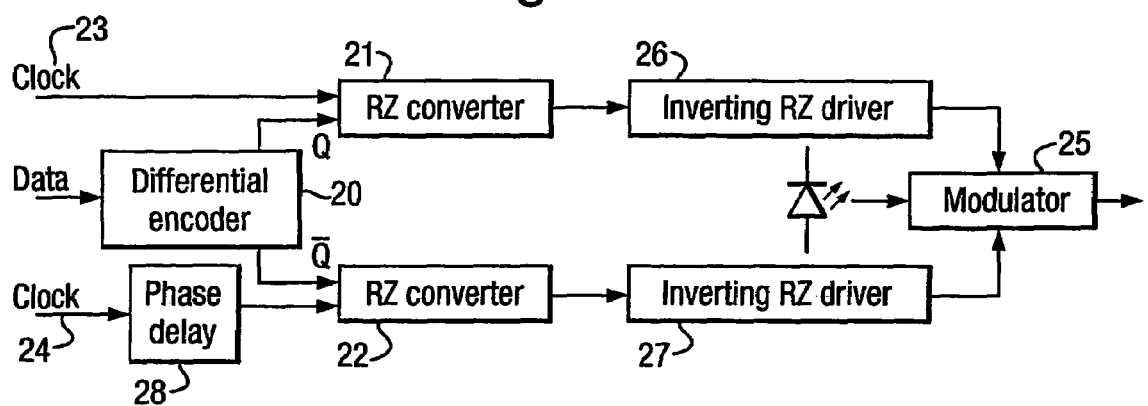
FIG. 2 shows an RZ-DPSK encoded transmitter in accordance with the present invention.

FIG. 2 shows a DPSK transmitter in accordance with the present invention. The transmitter shown in FIG. 2 shows a differential encoder 20 which encodes an electrical data stream in the same manner as the prior transmitter described with reference to FIG. 1. The differential encoder of FIG. 2 has two outputs. A suitable differential encoder is available from Inphi and is their 13751 DE 13 Gbps differential encoder. Each output (Q,$\overline{Q}$) is differentially encoded data but they are of opposite polarity to one another. Each output enters an RZ converter 21,22 driven by a clock 23,24. Suitable RZ converters are also available from Inphi, e.g. their 13707 RZ product. The RZ converters output RZ converted differentially encoded data. This data is applied to opposite electrodes of a dual electrode Mach Zehnder (MZ) modulator 25 coupled to a coherent light source, by RZ drivers 26,27. A suitable MZ modulator is available from Sumitomo Osaka Cement Co. Ltd. and is their 10 Gbit/s Dual Electrode Intensity Modulator. The RZ signals are amplified by the RZ drivers. The RZ drivers are shown as inverting RZ drivers 26,27 as these give rise to better quality output than non-inverting RZ drivers. However, non-inverting RZ drivers could be used. Inverting RZ drivers are available from LA Techniques, e.g. their LA32-04-04 driver product.

The modulator should be biased such that light from the two arms of the MZ in antiphase gives rise to a maximum optical throughput. Continuous RZ optical pulses can be produced by changing the relative phase between the two arms from in phase (no light) to antiphase (maximum light). The light is either 'pushed' out of phase by driving one arm or 'pulled' out of phase by driving the other. The phase of each RZ pulse depends on whether the light is being pushed or pulled, hence phase encoded pulses (PSK) can be produced.

One of the RZ converter outputs can be delayed by adjusting the phase delay 28 of the clock signal into it providing a method of synchronizing the two drive signals.

The use of inverting RZ drivers gives rise to negative chirp on the optical RZ signals. Non-inverting RZ drivers give rise to positive chirp. Controlling chirp through the use of inverting or non-inverting drivers is useful for pulse compression or pulse broadening in positive and negative dispersion fibres. FIG. 3 shows the transmitter output using inverting RZ drivers. The top plot shows the intensity of the output, the middle plot shows the phase and the bottom plot shows the chirp. It can be seen that the inverting RZ drivers give rise to negative chirp, i.e. the leading edge of each pulse has reduced frequency and the trailing edge has increased frequency.

The optical RZ pulse width can be continuously controlled by adjusting the electrical duty cycle of the RZ drive signal. Conventional RZ DPSK transmitters have a fixed pulse width.

What is claimed is:

1. An optical differential phase shift keyed transmitter comprising:
    a differential encoder having first and second outputs, the first and second outputs being of opposite polarity to one another, wherein the differential encoder differentially encodes data to produce first and second data streams of opposite polarity;
    a first RZ converter connected to the first output of the differential encoder and a second RZ converter connected to the second output of the differential encoder, wherein the first and second RZ converters convert the first and second data streams to RZ signal format;
    a first RZ driver connected to an output of the first RZ converter and a second RZ driver connected to an output of the second RZ converter, wherein the first RZ driver amplifies a first of the data streams to generate a first RZ driven data stream after the first data stream has been converted to the RZ signal format, and the second RZ driver amplifies a second of the data streams to generate a second RZ driven data stream after the second data stream has been converted to the RZ signal format; and
    a dual electrode Mach Zehnder modulator to which an unmodulated coherent light source is coupled, wherein the dual electrode Mach Zehnder modulator phase modulates a coherent light signal from the coherent light source and outputs as a differential phase shift keyed RZ optical signal, and wherein first and second electrodes of the Mach Zehnder modulator are driven sequentially by the first RZ driven data stream and the second RZ driven data stream, respectively.

2. A transmitter according to claim 1, wherein either the first or second RZ converter outputs can be delayed by adjusting the phase of a clock signal input to the RZ converter.

3. A transmitter according to claim 1, wherein one of the RZ converter outputs can be delayed by adjusting the phase of a clock signal input to the first and second RZ converter.

4. A transmitter according to claim 1, wherein the first and second RZ drivers are inverting RZ drivers configured to convert RZ signals output from the RZ converters to inverted RZ signals.

5. A transmitter according to claim 1, wherein the first and second RZ drivers are non-inverting RZ drivers.

6. A method of encoding data as a differential phase shift keyed RZ optical signal comprising the steps of:
    differentially encoding the data to produce two data streams of opposite polarity;
    converting each data stream to RZ signal format;
    amplifying at a first RZ driver a first of the data streams to generate a first RZ driven data stream after the first data stream has been converted to the RZ signal format;
    amplifying at a second RZ driver a second of the data streams to generate a second RZ driven data stream after the second data stream has been converted to the RZ final format;
    driving a first electrode of a dual electrode Mach Zehnder modulator to which an unmodulated coherent light source is coupled with the first RZ driven data stream and sequentially driving a second electrode of the dual electrode Mach Zehnder modulator with the second RZ driven data stream; and phase modulating a coherent light signal from the coherent light source at the dual electrode Mach Zehnder modulator, and outputting as a differential phase shift keyed RZ optical signal.

7. A method according to claim 6, wherein the first and second RZ data streams are inverted RZ data streams.

* * * * *

UNITED STATES PATENT AND TRADEMARK OFFICE
CERTIFICATE OF CORRECTION

| | | |
|---|---|---|
| PATENT NO. | : 7,885,550 B2 | |
| APPLICATION NO. | : 10/595981 | |
| DATED | : February 8, 2011 | |
| INVENTOR(S) | : Oberland | |

It is certified that error appears in the above-identified patent and that said Letters Patent is hereby corrected as shown below:

Column 1
Line 36, change "point In" to --point. In--

Column 4
Line 60, change "final" to --signal--

Signed and Sealed this
Tenth Day of April, 2012

David J. Kappos
*Director of the United States Patent and Trademark Office*